United States Patent [19]
Osborne

[11] 3,908,727
[45] Sept. 30, 1975

[54] FASTENER
[75] Inventor: Thomas Dixon Osborne, Murfreesboro, Tenn.
[73] Assignee: Microdot Inc., Greenwich, Conn.
[22] Filed: June 7, 1974
[21] Appl. No.: 477,176

Related U.S. Application Data
[63] Continuation-in-part of Ser. No. 274,598, July 24, 1972, abandoned.

[52] U.S. Cl. .................................................. 151/7
[51] Int. Cl.² ........................................ F16B 39/34
[58] Field of Search ...................................... 151/7

[56] References Cited
UNITED STATES PATENTS
| | | | |
|---|---|---|---|
| 2,533,894 | 12/1950 | Podell | 151/7 |
| 3,227,198 | 1/1966 | Coyle | 151/7 |

Primary Examiner—Edward C. Allen
Attorney, Agent, or Firm—Harness, Dickey & Pierce

[57] ABSTRACT

A threaded fastener having a shallow cavity formed in a portion of its thread and a deformable material in the cavity.

2 Claims, 6 Drawing Figures

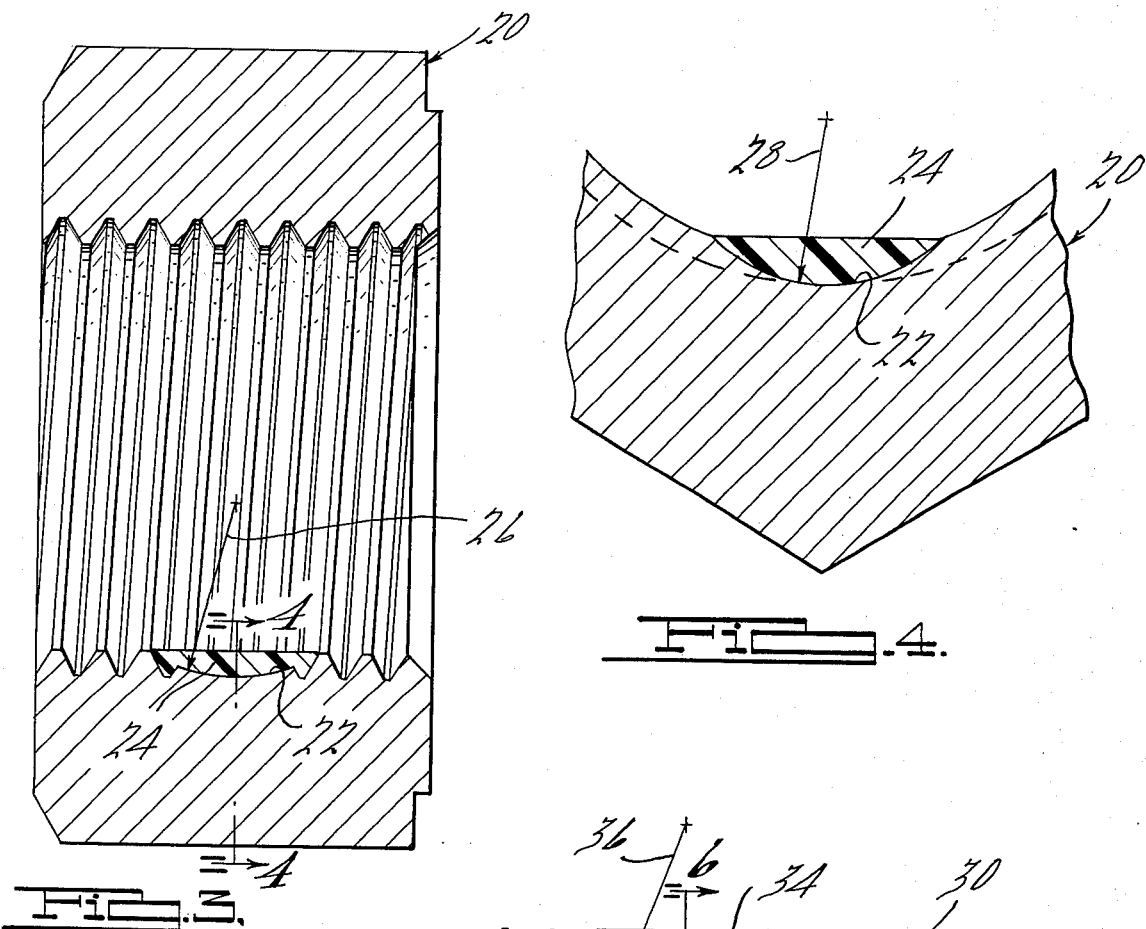
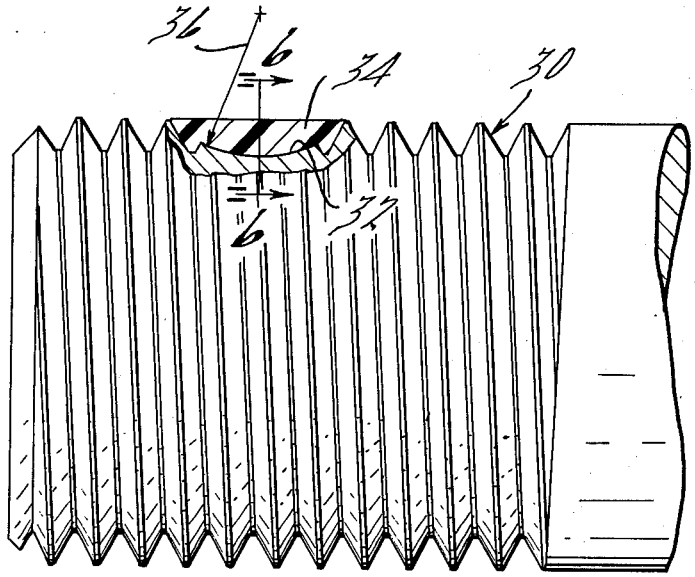
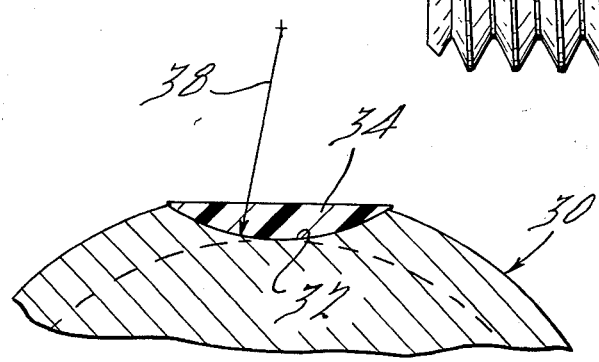

3,908,727

FASTENER

This application is a continuation-in-part of application Ser. No. 274,598, filed July 24, 1972, now abandoned.

BACKGROUND AND SUMMARY OF THE INVENTION

This invention relates to a threaded fastener of the type adapted to torsionally lock with a complementary fastener.

Heretofore, deformable materials of various well-known types have been applied to the thread of fasteners in attempts to improve and/or control the locking torque characteristic of the fastener with a complementary fastener. In one prior type fastener, a radial hole is drilled through the fastener and the deformable material is inserted therein. Such drilling can create potentially undesirable stress concentrations; the tolerance of the drilled hole and the fit of material therein can cause undesirable variation in torque consistency and reuseability of the fastener. In another prior fastener, deformable material is applied directly to the thread of the fastener. Subsequent use of this fastener causes part or all of the deformable material to be sheared away, and this likewise can cause variation in torque consistency and fastener reuseability.

One important object of the present invention is to eliminate, or at least alleviate, problems such as those mentioned above. Further objects are to provide: a reliable prevailing torque fastener; a locking arrangement which is suitable for use with a wide variety of fastener sizes and torque requirements; a locking fastener which is reliable and economical to make; a locking fastener in which the basic strength of the fastener is not impaired; a fastener which will function properly to maintain locking torque at various temperatures; and a fastener which has an improved, more reliable, torque characteristic. The invention provides a cavity formed in the thread of a fastener with a deformable material in the cavity. When the fastener is used, the material is compressibly deformed within the cavity rather than being sheared away. The invention provides a reliable prevailing torque fastener.

BRIEF DESCRIPTION OF THE DRAWINGS

The accompanying drawings illustrate a preferred embodiment of the invention in accordance with the best mode presently contemplated for carrying out the invention.

FIG. 3 is a view similar to FIG. 2 showing another embodiment of the invention.

FIG. 4 is an enlarged transverse sectional view taken along line 4—4 in FIG. 3.

FIG. 5 is a longitudinal view of a further embodiment of the invention and having a portion fragmented away.

FIG. 6 is an enlarged transverse sectional view taken along line 6—6 in FIG. 5.

DESCRIPTION OF THE PREFERRED EMBODIMENTS

Figure 1:
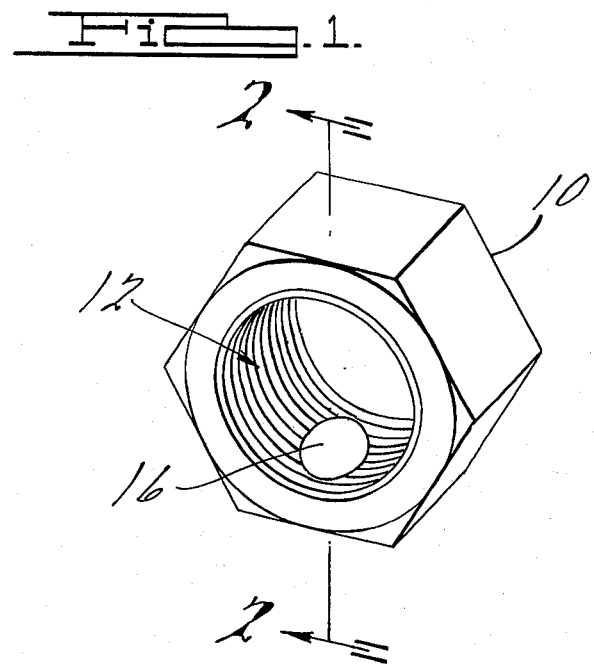
FIG. 1 is a perspective view of a fastener according to the present invention.
Figure 2:
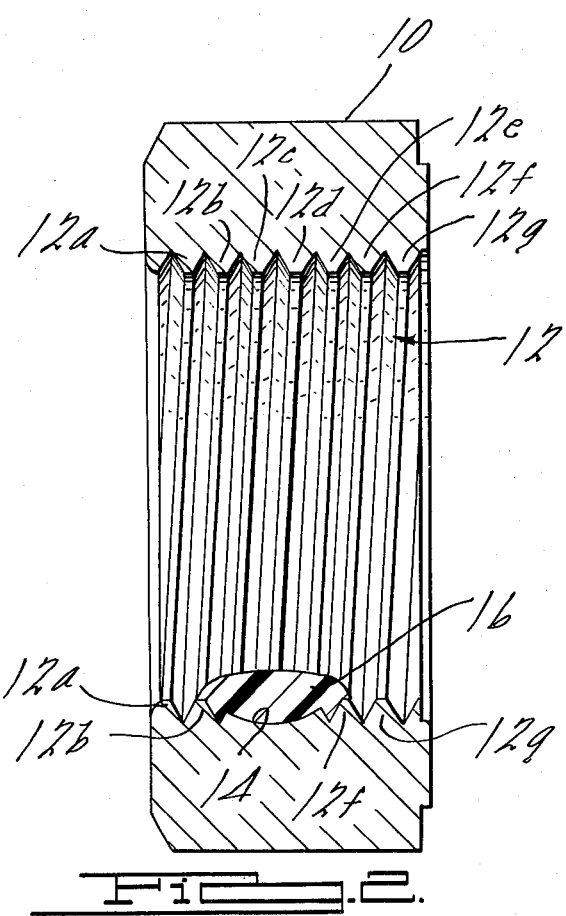
FIG. 2 is an enlarged vertical sectional view taken along line 2—2 in FIG. 1.

The present invention is shown in a first embodiment in FIGS. 1 and 2 as applied to a nut 10. Nut 10 has an internal thread 12 consisting of successive convolutions 12a, 12b, 12c, 12d, 12e, 12f, and 12g. A cavity of generally circular shape 14 is formed in thread 12 across convolutions 12c, 12d, and 12e. Cavity 14 is concave of partly spherical form, having its maximum depth at its center. Moreover, cavity 14 preferably does not protrude beyond the root of thread 12 so that the inherent strength of nut 10 is unimpaired. Thus, with cavity 14 providing a continuous surface facing radially inwardly of nut 10, a blob of deformable material 16 is deposited into cavity 14. Blob 16 may completely fill and slightly overflow cavity 14 to form a slightly raised, or domed, surface which is radially inwardly of the crest of the thread. When nut 10 is threaded onto a bolt, blob 16 is not sheared away, but instead at least a portion of the blob deforms into the shape of the space between cavity 14 and the threaded portion of the bolt directly facing the cavity. Accordingly, at least some of the blob material is compressed within cavity 14 between the nut and the bolt thereby providing a reliable prevailing torque fastener.

By varying the material of blob 16 and/or the size and shape of cavity 14 (for example, its depth and/or expanse), the prevailing torque range can be varied and the fastener can function properly at various temperatures. Cavity 14 provides an area for compressive loading of the deformable material so that more consistent torques can be developed and the problems enumerated above relative to prior art fasteners are eliminated or substantially reduced. Since deformable material remains in cavity 14 after nut 10 is unfastened, the nut is suitable for reuse.

It is to be noted that the angle which the rim portion of cavity 14 makes with the imaginary cylindrical surface defined by the crest of thread 12 is relatively small. Thus, when nut 10 is used, radial compression loading of blob 16 is directed substantially normal to cavity 14 over the full extent thereof. Since the loading around the rim portion of cavity 14 is substantially normal thereto, shear of blob 16 with cavity 14 is minimized.

FIGS. 3 and 4 illustrate a second embodiment of the invention as applied to a nut 20. Nut 20 differs in two respects from the preceding embodiment. First, the shape of the cavity 22 is a generally ellipsoidal section rather than a spherical section and, second, the deformable resilient insert material forming the blob 24 has a flat, radially inwardly facing surface rather than a dome-shaped inner surface. By way of example, the longitudinal contour of cavity 22 is defined by a radius of curvature 26 (FIG. 3), and the circumferential contour by the radius of curvature 28 (FIG. 4). By way of illustration and not by way of limitation, the radius of curvature 26 has a dimension 0.1875 inches and the radius of curvature 28 a dimension 0.1062 inches as applied to a standard-sized ½ – 20 nut.

A still further embodiment of the invention is shown in FIGS. 5 and 6 as applied to a bolt 30. This embodiment is generally like the immediately preceding embodiment in that the cavity 32 has a generally ellipsoidal contour and the exposed surface of the insert material forming the blob 34 is generally flat. By way of example, cavity 32 has a longitudinal contour defined by a radius of curvature 36 (FIG. 5) and a circumferential contour defined by a radius of curvature 38 (FIG. 6). By way of illustration and not by way of limitation, the radius of curvature 36 has a dimension 0.1565 inches and the radius of curvature 38 a dimension 0.140 inches for a ½ – 20 standard-sized bolt.

In the embodiments disclosed, it will be appreciated that the radii of curvature shown are taken in planes passing through the center of the cavity and that the cavity surface will be somewhat irregular where the crest of the thread has been removed to form the cavity since the cavity is theoretically defined by the intersection of a smooth concave surface and a cylinder defined by the crest of the fastener thread. By way of example, the cavities may be formed in the fasteners by means of suitably shaped burring tools.

In accordance with applicant's invention the deformable resilient substance forming the blob of insert material is deposited in the cavity in an undeformed condition, and the cavity is defined by portions which lie on an imaginary surface of shallow dished form, the rim areas of which, in transverse cross section, make sufficiently small angles with the imaginary clyindrical surface defined by the crest of the fastener thread that, when the fastener is used, there is essentially negligible, if any, shearing of the insert material from the cavity. As a result, when the fastener is in use, the insert exhibits a generally radially directed locking force distributed over the cavity surface and the intersecting thread surfaces. The prior art forms having deep abrupt cavity walls suffer from a serious problem wherein insert material is sheared away by the rim of the cavity when the fastener is put to use. Applicant has discovered that this problem arises from the relatively large angles which the cavity wall makes in transverse cross section fasteners an imaginary cylindrical surface defined by the crest of the fastener thread. Specifically, when a complementary fastener is threaded onto a prior art fastener of this type, the insert is sheared at the edge of the cavity rim opposite where the insert is initially engaged by the complementary fasteners. As a consequence, at least a portion of the insert material which is disposed above the rim of the cavity is sheared away. The remaining insert material is therefore not compressibly deformed in the desired fashion but, rather, is subject to unknown variation resulting in variation in locking characteristics between fastners of the same design. In the prior art, the shearing problem is aggravated where the inserts are held in mechanically deformed condition since the edge of the cavity rim must bite into the insert even to retain the insert in the cavity.

In contrast, applicant's invention solves the shearing problem because of the relatively small angles in transverse cross section and because the insert material is deposited in an undeformed condition in the cavity. As a result, applicant's invention provides more consistent and better locking characteristics in a threaded fastener of the locking type.

While it is contemplated that various known techniques may be used for applying inserts to the fastener, an exemplary insert comprises nylon deposited into the cavity. The insert can be adhered to the cavity by means of a suitable adhesive material, such as an epoxy base binder. Alternatively, it is possible to adhere the insert material by means of applying heat and pressure to the insert when it is being applied to the fastener.

While it will be apparent that the preferred embodiments of the invention disclosed are well calculated to fulfill the objects above stated, it will be appreciated that the invention is susceptible to modification, variation, and change without departing from the spirit thereof.

What is claimed is:

1. In a threaded fastener having threads whose crests lie on an imaginary cylindrical surface: means defining a generally round, concave cavity having surface portions lying on an imaginary surface of partly spherical form and extending radially into and axially across a plurality of convolutions of the fastener thread; the rim portions of said imaginary surface of partly spherical form making relatively small angles of intersection with said imaginary cylindrical surface, a deformable material deposited in said cavity in an undeformed condition and filling said cavity; the depth of said cavity being not substantially greater than the depth of the threads, said angles of intersection being sufficiently small that upon engagement of said fastener with a complementary fastener, the bulk of said deformable material is progressively compressively deformed from its undeformed condition without being sheared away by the rim of said cavity and is compressively deformed between the two engaged fasteners such that a generally radially directed locking force is provided between the two engaged fasteners, which locking force is distributed over the entire surface of said cavity.

2. The invention defined in claim 1 wherein the rim of said cavity is elliptical in shape.

* * * * *

UNITED STATES PATENT OFFICE
CERTIFICATE OF CORRECTION

PATENT NO. : 3,908,727
DATED : September 30, 1975
INVENTOR(S) : Thomas D. Osborne It is certified that error appears in the above-identified patent and that said Letters Patent are hereby corrected as shown below:

Column 3, lines 29-30, "fasteners" should be --with--.

Signed and Sealed this sixteenth Day of December 1975

[SEAL]

Attest:

RUTH C. MASON
*Attesting Officer*

C. MARSHALL DANN
*Commissioner of Patents and Trademarks*